(12) United States Patent
Madanapalli et al.

(10) Patent No.: US 9,697,376 B2
(45) Date of Patent: Jul. 4, 2017

(54) FEDERATED CLOUD STORAGE SYSTEM

(71) Applicant: VMWARE, INC., Palo Alto, CA (US)

(72) Inventors: Narendra Prasad Madanapalli, Bangalore (IN); Reghuram Vasanthakumari, Bangalore (IN); Valluri Chowdary, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 19 days.

(21) Appl. No.: 14/801,858

(22) Filed: Jul. 17, 2015

(65) Prior Publication Data

US 2016/0292193 A1 Oct. 6, 2016

(30) Foreign Application Priority Data

Apr. 1, 2015 (IN) ............................ 1765/CHE/2015

(51) Int. Cl.
*G06F 21/62* (2013.01)
*H04L 29/08* (2006.01)
*H04L 29/06* (2006.01)

(52) U.S. Cl.
CPC ...... *G06F 21/6218* (2013.01); *H04L 67/1097* (2013.01); *H04L 63/08* (2013.01)

(58) Field of Classification Search
CPC .................................................. G06F 21/6218
See application file for complete search history.

(56) References Cited

U.S. PATENT DOCUMENTS

| 8,799,322 | B2* | 8/2014 | deMilo | G06F 17/30082 |
| | | | | 707/791 |
| 8,972,405 | B1* | 3/2015 | Chaulk | G06F 17/30194 |
| | | | | 707/737 |
| 9,294,550 | B2* | 3/2016 | Song | H04L 67/10 |
| 9,454,537 | B2* | 9/2016 | Prahlad | G06F 17/30156 |
| 2010/0332456 | A1* | 12/2010 | Prahlad | G06F 17/3002 |
| | | | | 707/664 |
| 2011/0022642 | A1* | 1/2011 | deMilo | G06F 17/30082 |
| | | | | 707/805 |
| 2011/0307451 | A1* | 12/2011 | El Haddi | G06F 17/3012 |
| | | | | 707/673 |
| 2012/0284527 | A1* | 11/2012 | Nagpal | H04L 63/04 |
| | | | | 713/189 |
| 2013/0024424 | A1* | 1/2013 | Prahlad | G06F 17/3002 |
| | | | | 707/640 |
| 2013/0232179 | A1* | 9/2013 | Chhaunker | G06F 17/3007 |
| | | | | 707/827 |

(Continued)

OTHER PUBLICATIONS

Wang et al.; Privacy-Preserving Public Auditing for Data Storage Security in Cloud Computing; Published in: INFOCOM, 2010 Proceedings IEEE; Date of Conference: Mar. 14-19, 2010; IEEE Xplore.*

(Continued)

*Primary Examiner* — Bradley Holder

(57) ABSTRACT

User storage is attached to a central storage management system when the central storage management system receives a request to attach a cloud-based user storage thereto. The central storage management system accesses the cloud-based user storage and determines a set of objects stored therein. For each object in the set of objects, the storage management system stores corresponding metadata therein.

20 Claims, 6 Drawing Sheets

(56) References Cited

U.S. PATENT DOCUMENTS

| | | | | |
|---|---|---|---|---|
| 2013/0332575 A1* | 12/2013 | Song | ........................ | H04L 67/10 |
| | | | | 709/219 |
| 2014/0237070 A1* | 8/2014 | Choi | ................... | H04L 67/1097 |
| | | | | 709/216 |
| 2014/0282938 A1* | 9/2014 | Moisa | ................. | G06F 21/6218 |
| | | | | 726/6 |
| 2015/0067125 A1* | 3/2015 | Madani | ............... | H04L 41/5054 |
| | | | | 709/223 |
| 2015/0089612 A1* | 3/2015 | Kuo | ...................... | H04L 63/083 |
| | | | | 726/7 |

OTHER PUBLICATIONS

Stuedi et al.; WhereStore: location-based data storage for mobile devices interacting with the cloud; Published in: Proceeding MCS '10 Proceedings of the 1st ACM Workshop on Mobile Cloud Computing & Services: Social Networks and Beyond; 2010; ACM Digital Library.*

* cited by examiner

FEDERATED CLOUD STORAGE SYSTEM

RELATED APPLICATIONS

Benefit is claimed under 35 U.S.C. 119(a)-(d) to Foreign application Serial No. 1765/CHE/2015 filed in India entitled "FEDERATED CLOUD STORAGE SYSTEM", on Apr. 1, 2015, by VMware, Inc., which is herein incorporated in its entirety by reference for all purposes.

BACKGROUND

Online end users are storing an increasing amount of data in the cloud. In response to the demand for cloud resources, a number of cloud storage providers have come into existence. Typically, a cloud storage provider allows an end user to establish one or more accounts. The end user is then able to access these accounts in order to store data. For a variety of reasons, an end user may establish accounts with multiple cloud storage providers, or, alternatively, establish multiple accounts with a single cloud storage provider. For example, cloud storage providers often place an upper limit on the amount of cloud storage that a single end user account may utilize. Thus, if an end user requires more data than a single cloud storage provider allows the end user to store, the end user must then establish additional accounts to accommodate those storage requirements. As another example, some end users may want to organize their data according to personal preferences. For example, an end user may store sensitive data at a cloud storage provider that the end user perceives as providing heightened data security, while the end user stores less sensitive data at other less secure cloud storage providers.

Storing data at multiple cloud storage providers (or on multiple accounts with the same cloud storage provider) presents data management issues. An end user who stores data in this manner must maintain and use different login credentials in order to access all of his or her data that is stored in the cloud. Further, the end user lacks a single, central place from which to view and manage all of this data in a holistic manner. For example, an end user may maintain a database at a cloud storage provider that eventually exceeds the storage limits of that provider. Without a central point from which to manage data storage in the cloud, the end user must search through several cloud storage accounts in order to locate an account on a cloud storage provider that can accommodate the user's storage needs. Once such an account is located, the end user needs to perform the time-consuming steps of downloading data from the previous cloud storage provider and uploading that data to the new cloud storage provider.

SUMMARY

In a first embodiment, a method of attaching user storage to a central storage management system is provided. The method includes receiving first and second requests to attach, respectively, a first and a second cloud-based user storage to the central storage management system. The method further includes accessing the first and second cloud-based user storages and determining first and second sets of objects stored therein. The method further includes, for each object in the first and second sets of objects, storing corresponding metadata in the central storage management system.

Further embodiments provide a non-transitory computer-readable medium that includes instructions that, when executed, enable a host computer to implement one or more aspects of the above method, and a system that includes, a processor, memory, and a central storage management system configured to perform one or more aspects of the above method.

DETAILED DESCRIPTION

Figure 1:
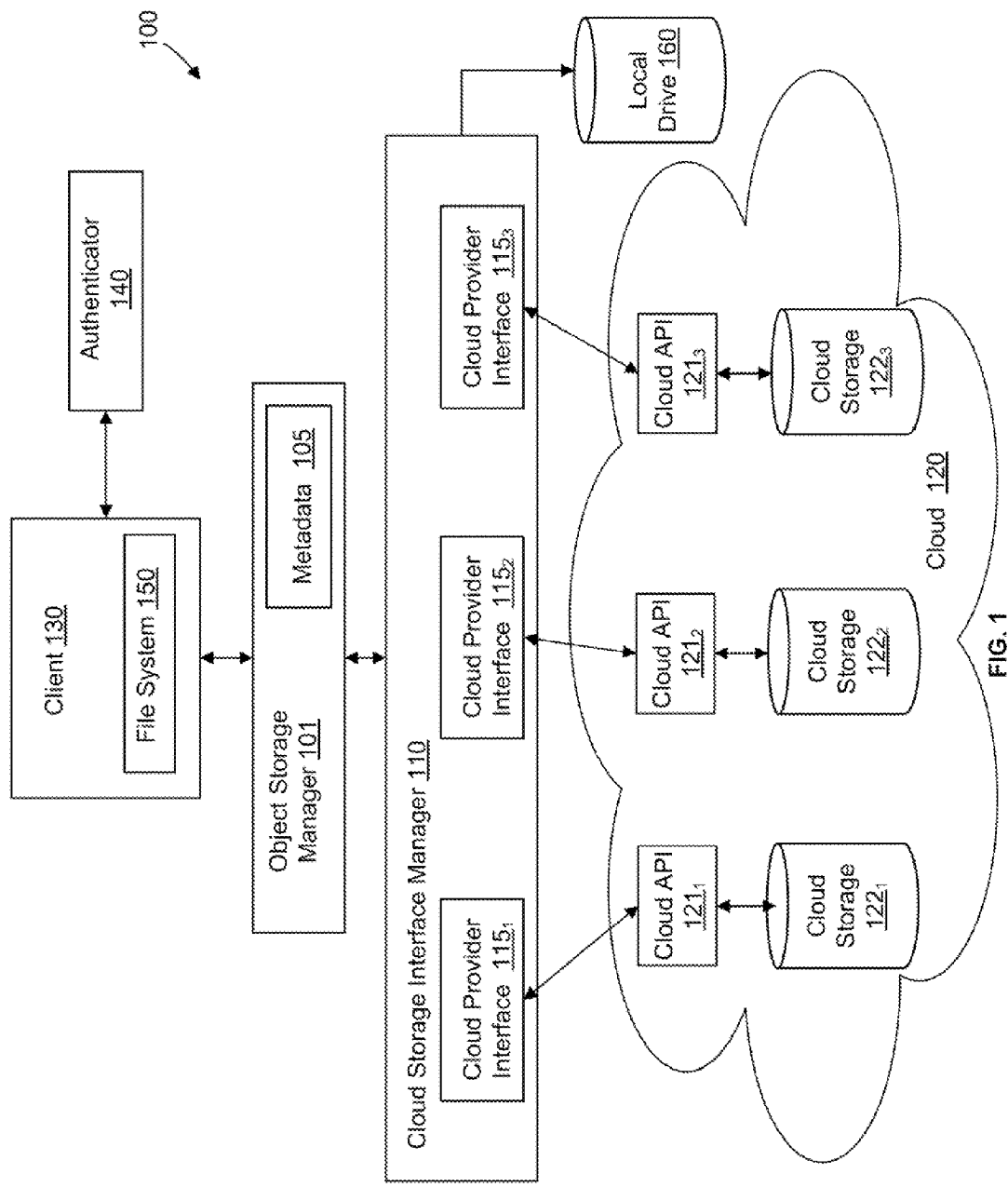
FIG. 1 is a conceptual diagram that illustrates a federated cloud storage system, according to one or more embodiments.

FIG. 1 is a conceptual diagram that illustrates a federated cloud storage system 100, according to one or more embodiments. An end user of federated cloud storage system 100 accesses the system through a federated cloud storage client, referred to herein as client 130. Client 130 is software that executes on a standard desktop computer, server, workstation, or laptop computer. In addition, client 130 may also execute on a smartphone or tablet device. In some embodiments, client 130 implements a graphical user interface (GUI), which allows an end user to use client 130 to access and manage objects (e.g., files) in federated cloud storage system 100 graphically. In other embodiments, client 130 implements a command line interface (CLI) through which an end user enters file management commands (such as the mount command provided by the Linux® operating system) and file management commands (such as the ls command provided by several Unix-based shells).

In order to access federated cloud storage system 100, an end user is authenticated. Thus, as shown in FIG. 1, the end user of the system (using client 130) communicates with an authenticator 140. Authenticator 140 is a server process that may run on the same computer as client 130. Alternatively, authenticator 140 may run on a remote server that is accessible over a network. When accessing authenticator 140, an end user provides credentials (such as a user identifier and password). In some embodiments, a user may provide a software key that authenticator 140 then compares with a key that is locally stored. Various forms of computer-based authentication are possible and within the scope of the present invention.

Once authenticated, an end user may access and use federated cloud storage system 100. In the embodiment depicted in FIG. 1, client 130 includes a file system 150. File system 150 is a file system that serves as a front end for accessing objects in federated cloud storage system 100 (i.e., files and directories) that an end user has access to. An end user interacts with file system 150 to centrally view files and directories that the user has stored at different cloud providers. For instance, an end user may have files and directories stored with a first cloud provider, such as Google Drive™ provided by Google, Inc. The same user may also have files and directories stored with a second cloud provider, such as Dropbox® provided by Dropbox, Inc. Using file system 150, the end user may view all of the files to which the user has access on both of these cloud providers. Further, using file system 150, an end user may, from a single interface, update or delete files stored with different cloud providers. An end user may also create new files using file system 150, where the new files may be stored with any of the cloud storage providers to which the end user has access. Further, an end user may, using file system 150, move or copy files between accessible cloud storage providers. According to one or more embodiments, file system 150 accepts Portable Operating System Interface (POSIX) commands for manipulating objects in federated cloud storage system 100. Examples of such POSIX commands include cd (change directory), cp (copy file), and rm (remove file or directory).

In addition, file system 150 provides functionality for an end user to mount data stored on various cloud storage providers as directories that appear as local directories on the user's host computer (i.e., the host computer that executes client 130). In the event that an end user wishes to simultaneously view both locally stored files and directories (i.e., files and directories stored on an end user's local hard drive) and files and directories stored with one or more cloud providers, file system 150 provides a mechanism for an end user to attach one or more locally stored directories to federated cloud storage system 100. The combination of locally stored directories with additional cloud-based storages, and the presentation of the combination as a unified data storage for the end user (while, at the same time, hiding the underlying details of the local and cloud-based storages from the end user), is referred to as cloud storage "federation."

It should be noted that files and directories that an end user has stored with multiple cloud storage providers are not altered in order to make those files and directories accessible in federated cloud storage system 100. That is, cloud-based objects (directories and files), which are typically of variable size, are accessed in federated cloud storage system 100 (using file system 150) without splitting those objects into fixed-size portions, and storing those fixed-size portions in different regions of a cloud-based storage. Thus, federated cloud storage system 100 avoids the file fragmentation that is often present in typical cloud-based storage schemes.

As shown in FIG. 1, file system 150 may reside as a component of client 130. Alternatively, file system 150 may reside on a remote server computer. It should be noted that file system 150 does not in fact store any of the data that an end user has previously stored with a cloud provider (or has stored on a local drive). Rather, file system 150 implements one or more data structures that allow an end user to view the organization of files and directories stored locally and with one or more cloud providers, and to centrally manage those files. As previously mentioned, end users may interact with file system 150 by issuing POSIX-compliant file manipulation commands, such as "cp" and "rm". In one or more embodiments, file system 150 implements similar data structures found in a conventional hierarchical file system, such as the Unix file system. For example, file system 150 may include directory data structures and file data structures (often referred to as inodes) that, among other things, establish the hierarchical structure of files that are viewable within file system 150. However, inodes in a typical hierarchical file system (such as the Unix file system) also contain pointers to blocks of data stored on a locally attached storage device (such as a hard drive of a host computer). File system 150, however, communicates with an object storage manager 101, which is also depicted in FIG. 1, in order to enable the end user to retrieve and update filed data that the end user has stored either locally or in the cloud.

Object storage manager 101 stores data that enables an end user to access (using client 130 and file system 150) the various files and directories that are accessible to the user from various cloud storage providers. Typically, the end user separately logs into various cloud storage providers to access data. However, object storage manager 101 makes it possible for the end user to access these files from a single central point.

Object storage manager 101 provides the aforementioned user access by storing metadata 105 that corresponds to objects that an end user has stored with one or more cloud storage providers. According to embodiments, objects that an end user stores with a cloud storage provider include files and directories that contain files. In embodiments, metadata 105 stores for each object (i.e., for each file or directory) the location of the object (i.e., an identifier, or address, of the particular cloud provider that the object is stored at). Further, metadata 105 stores, for each object, hierarchical data, which enables file system 150 to organize and display the objects properly in a file hierarchy. Metadata 105 also stores cloud storage provider credentials for an end user. These cloud storage provider credentials are stored in metadata 105 to enable object storage manager 101 to access the various cloud storage providers to which an end user has access, and to retrieve the files and directories for the end user when requested to do so. It should be noted that the credentials stored in metadata 105 may differ from the credentials provided to authenticator 140 that allow an end user to access federated cloud storage system 100, although in some embodiments, credentials may be centrally stored at authenticator 140.

Object storage manager 101 accesses different cloud storage providers using a common interface. In FIG. 1, this interface is depicted as a cloud storage interface manager 110. In some embodiments, cloud storage interface manager 110 runs as a server process that accepts cloud storage requests from object storage manager 101. Object storage manager 101 issues cloud storage requests to various cloud storage providers in order to obtain information pertaining to the objects (i.e., directories and files) that an end user has stored with these cloud storage providers. Object storage manager 101 stores the obtained information as metadata 105 corresponding to each of the objects. In one or more embodiments, a cloud storage request includes cloud storage provider credentials for an end user that has files and directories stored with a particular cloud storage provider. After object storage manager 101 stores metadata 105 corresponding to the objects an end user has stored with one or more cloud storage providers, file system 150 uses the stored metadata 105 to allow an end user to view (using client 130) the overall hierarchical organization of files stored with multiple cloud providers.

One example of a cloud storage request is a read request for a particular file stored with a cloud storage provider. For such a read request, object storage manager 101 transmits a request to cloud storage interface manager 110 that includes a cloud storage provider identifier (such as a network name or address that indicates the location of the cloud storage provider). The read request also includes cloud storage provider credentials for an end user that initiated the request. Further, the read request includes an identifier for the file being read, which enables the cloud storage provider to locate the file stored therein. In response to the read request, the cloud storage provider transmits the data blocks corresponding to the file back to object storage manager 101. Object storage manager 101, in turn, transmits the file blocks back to the end user that initiated the read request. It should be noted that embodiments of object storage manager 101 may not store any file data. In such embodiments, file data is persisted only at cloud storage providers from which the data blocks are received. However, in other embodiments, object storage manager 101 includes a data cache that stores file data, which allows an end user to more quickly access frequently referenced file blocks.

Further examples of cloud storage requests include file (or directory) create requests, which result in the creation of files and directories at a specific cloud storage provider. In addition, write requests result in the updating of already existing files and directories at a specific cloud storage provider. Delete requests result in the deletion of files and directories at a specific cloud storage provider. As was the case for read requests, create, delete, and write requests also include an identifier for the file being created, deleted, or written to, as the case may be. Further, create and write requests also include data blocks for the corresponding file.

In some embodiments, cloud storage interface manager 110 is a software library that contains software modules that may be invoked by object storage manager 101. Thus, instead of transmitting cloud storage requests to a server process executing in cloud storage interface manager 110, object storage manager 101 invokes a software module through a standard application programming interface (API). When invoking the software module, object storage manager 101 passes one or more parameters to cloud storage interface manager 110 (such as cloud storage provider credentials), which enables the invoked module to obtain the aforementioned information and data from the relevant cloud storage providers.

As previously mentioned, object storage manager 101 transmits requests to (or invokes software modules in) cloud storage interface manager 110 in a standardized manner. That is, object storage manager 101 communicates with cloud storage interface manager 110 according to an interface that is independent of any particular cloud storage provider. However, different cloud storage providers typically have different methods of communicating with external entities. In some cases, cloud storage providers communicate with external entities by exposing a specific API, which an external entity invokes in order to access information stored with the cloud storage provider. In order to support standardized communication by object storage manager 101 with one or more different cloud storage providers, cloud storage interface manager 110 includes one or more cloud provider interfaces 115. In the embodiment depicted in FIG. 1, cloud storage interface manager 110 includes three such cloud provider interfaces: cloud provider interface $115_1$, cloud provider interface $115_2$, and cloud provider interface $115_3$. When cloud storage interface manager 110 receives a cloud storage request (or, alternatively, when a software module within cloud storage interface manager 110 is invoked), cloud storage interface manager 110 determines (based on the request) a target cloud storage provider corresponding to the request. After determining the target cloud storage provider, cloud storage interface manager 110 invokes a cloud provider interface 115 that corresponds to the target cloud storage provider.

For example, cloud storage interface manager 110 may receive a request that identifies cloud storage $122_1$ as a target cloud storage provider. Cloud storage $122_1$ is shown in FIG. 1 as existing in cloud 120, which represents a network over which multiple cloud storage providers may be accessed (such as the Internet). In this event, cloud storage interface manager 110 determines that cloud provider interface $115_1$ is to be invoked. Cloud provider interface $115_1$ then communicates the cloud storage provider request received by cloud storage interface manager 110 to cloud storage $122_1$. In order to accomplish this communication, cloud provider interface $115_1$ communicates with cloud API $121_1$, which, according to embodiments, is a web API exposed by cloud storage $122_1$ that adheres to Representational State Transfer (or REST) architectural model. For example, if cloud storage $122_1$ is a Google Drive™, then cloud API $121_1$ would include various method calls that Google Drive™ provides in order to manage files therein, such as "update," "copy," "delete," "update," and "trash." However, if cloud storage $122_1$ is another provider, then the semantics of cloud API $121_1$ would be different (i.e., a different set of method calls would be exposed by the cloud storage provider).

In like manner, if the target of a cloud storage request is cloud storage $122_2$, then cloud storage interface manager 110 invokes cloud provider interface $115_2$. Cloud provider interface $115_2$ communicates with cloud storage $122_2$ using cloud API $121_2$. Similarly, cloud provider interface $115_3$ communicates with cloud storage $122_3$ using cloud API $121_3$.

It should be noted that cloud storage interface manager 110 may include any number of cloud provider interfaces 115, each of which corresponds to (and communicates with) a particular cloud storage provider. Further, as shown in FIG. 1, cloud storage interface manager 110 also communicates with local drive 160. Local drive 160 is, in some embodiments, a local hard drive of a host computer from which an end user issues a cloud storage request. In other embodiments, local drive 160 may be a disk drive that is locally accessible to an end user over a local area network (LAN). In some embodiments, local storage 160 may be user local storage which can be exposed to federated cloud system 100 with an appropriate policy based control. Local storage 160 can be accessible directly, or in other embodiments, indirectly, in local storage 160 is accessible through network shares or via other channels based on the control policy. When a cloud storage interface manager 110 receives a request corresponding to local drive 160, cloud storage interface manager 110 communicates with local drive 160 through a local storage interface 116. Local storage interface 116 then accesses local drive 160 through, for example, a local or network file system.

Figure 2:
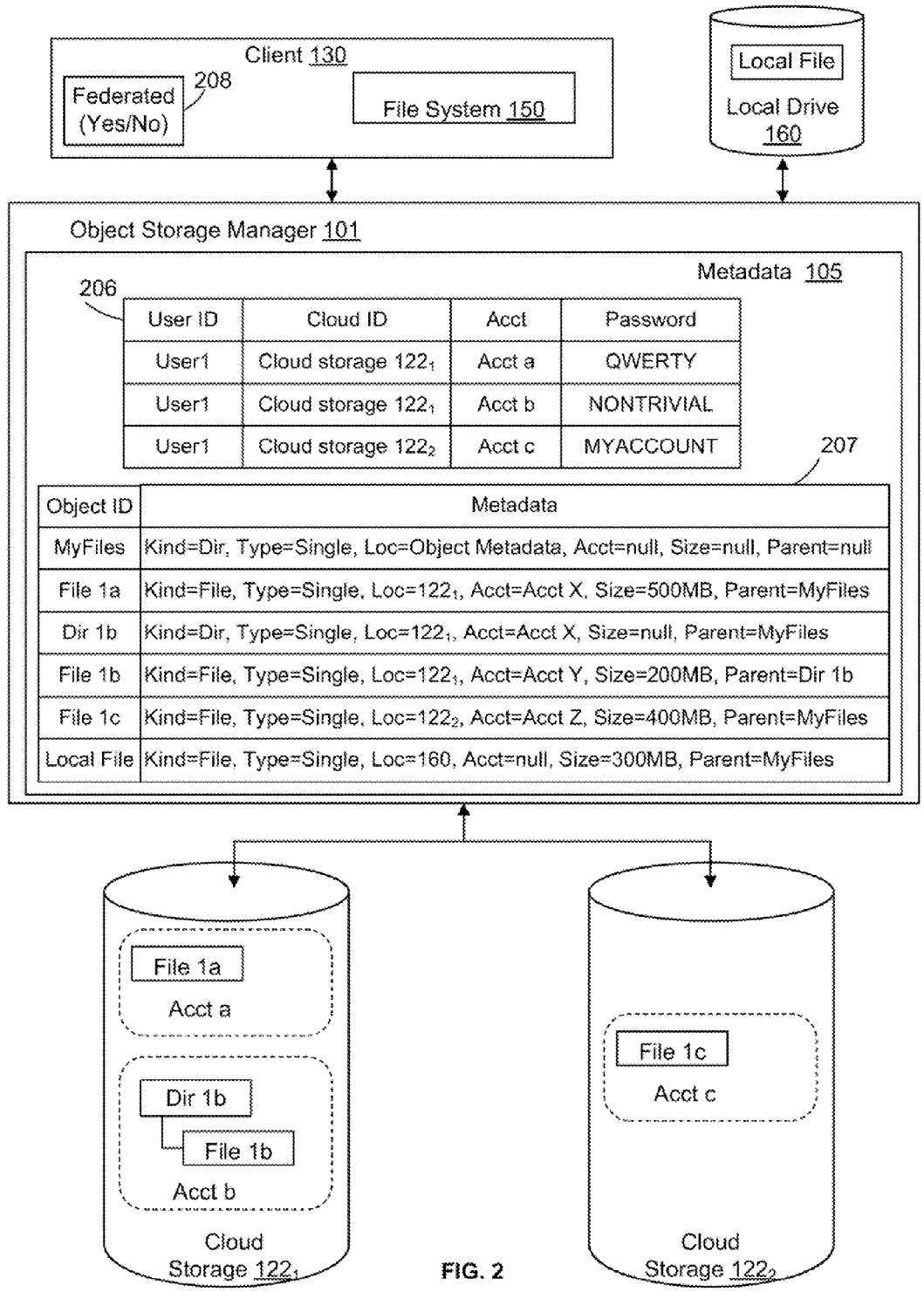
FIG. 2 is a conceptual diagram that depicts metadata stored in a federated cloud storage system for a particular end user, according to embodiments.

FIG. 2 is a conceptual diagram that depicts metadata stored in federated cloud storage system 100 for a particular end user, according to embodiments. Metadata 105 is included within object storage manager 101. As shown in FIG. 2, the metadata for an end user includes data that corresponds to cloud storage provider credentials for the end user, which is depicted in table 206. Metadata 105 also includes an object store corresponding to an end user, which is depicted as table 207. In addition, FIG. 2 depicts a client setting referred to as a federated indicator 208. According to one or more embodiments, federated indicator 208 provides information to file system 150 as to whether the objects (i.e., directories and files) should be displayed to an end user in "federated" mode or in "non-federated" mode. These modes will be further described below.

In addition, FIG. 2 displays object storage manager 101 as being in direct communication with cloud storage providers (i.e., cloud storage $122_1$ and cloud storage $122_2$), as well as with local drive 160. However, this is for illustrative purposes and, it should be noted, that communication between object storage manager 101 and cloud storages 122 is conducted through cloud storage interface manager 110 (as shown in FIG. 1).

In the embodiment shown in FIG. 2, table 206 stores cloud storage credentials for a particular end user. As previously mentioned, in order for object storage manager 101 to access the various cloud storage providers that the end user has stored data with, object storage manager 101 maintains sets of cloud storage credentials for the end user, each set of credentials corresponding to an account that the end user has with one cloud storage provider.

In the embodiment depicted in FIG. 2, each row of table 206 stores a set of cloud storage credentials for an end user. As shown, each row of table 206 comprises a number of fields, where each of the fields may be an alphanumeric string. A user ID field stores an identifier for an end user of federated cloud storage system 100. This user identifier is the user identifier that the end user provides to authenticator 140 in order to access federated cloud storage system 100, as was previously described. Cloud ID is an identifier for a particular cloud storage provider. According to embodiments, object storage manager 101 provides a cloud ID to cloud storage interface manager 110 when issuing a cloud request. Cloud storage interface manager 110 uses the cloud ID so provided in order to determine the correct cloud provider interface 115 to which the cloud request should be directed. The account field (denoted as "Acct") identifies an account that an end user maintains at a corresponding cloud storage provider. The password field stores the password for the corresponding cloud storage account. In one or more embodiments, the password field may be encrypted to provide a layer of security. Further, in some embodiments, an end user stores the data in table 206 using, for example, an input screen provided by client 130. In other embodiments, a system administrator stores the data in table 206 using an administrative console device (not shown).

In the example shown in FIG. 2, table 206 stores user credentials for User1, which is the user ID that the particular end user authenticated with in order to gain access to federated cloud storage system 100. As shown in table 206, the end user having user ID User1 maintains three separate cloud storage accounts. The first account is with cloud storage $122_1$, the account identifier is "a", and the account password is "QWERTY." This information is stored in a record of table 206. Similarly, the end user having user ID User1 has a second account, which is also with cloud storage $122_1$. The account identifier for the second account is "b", and the password for the account is "NONTRIVIAL." It should be noted that, typically, an end user may maintain multiple cloud storage accounts (such as, for example, multiple Google Drive™ accounts) in order to keep data items separated from each other. Further, the end user having user ID User1 maintains a third cloud storage account with cloud storage $122_2$, where the account identifier is "c", and the password is "MYACCOUNT."

Object storage manager 101 uses the information (i.e., cloud provider credentials) stored in the records of table 206 in order to gain access to cloud storage accounts (e.g., accounts a, b, and c). Object storage manager 101 gains access to the accounts in order to obtain the information corresponding to the objects (i.e., directories and files) that is stored as metadata 105. Metadata 105 is used by file system 150 in order to construct an integrated hierarchy of objects that the end user has stored at one or more cloud providers. Object storage manager 101 also uses the cloud provider credentials stored in table 206 to perform read, write, create, and update functions on the objects stored with one or more cloud storage providers.

Table 207 stores object metadata that corresponds to each of the objects that an end user has stored with one or more cloud storage providers. According to embodiments, object storage manager 101 updates table 207 when an end user account maintained with a cloud storage provider is "attached" to (or associated with) federated cloud storage system 100. That is, when an end user or system administrator associates an end user account maintained at a cloud storage provider with federated cloud storage system 100, object storage manager 101 communicates with the cloud storage provider (using credentials stored in table 206) to obtain information corresponding to the objects the end user has stored with the cloud storage provider, and stores metadata corresponding to the obtained information in table 207. To associate an end user account maintained at a cloud storage provider with federated cloud storage system 100, an end user provides (using client 130) cloud storage provider credentials to object storage manager 101. Object storage manager 101 stores the cloud storage provider credentials in table 206 and uses those credentials to access the information corresponding to the objects maintained at the corresponding cloud storage provider. Further, an end user provides (using client 130) an "attachment point" (or "mount point") to file system 150. The attachment point is a directory in file system 150 at which the directories and files maintained with the cloud storage provider are mounted (or "attached"). Thus, after attachment of the directories and files maintained with the cloud storage provider, those directories and files appear to the end user as integrated with file system 150. In addition, object storage manager 101 updates table 207 when a new file or directory is created in federated cloud storage system 100, or when a file or directory is updated or deleted.

Metadata 105 for an object includes, but is not limited to, an object kind, an object size, an object type, a location for the object (e.g., a particular cloud provider or local storage), an identifier for a cloud storage provider account, and a parent directory associated with the object. Each of these data items will be described in further detail below. In the embodiment shown in FIG. 2, metadata 105 is stored for each user object in a record in table 207. Each record in table 207 stores metadata 105 for an object as a plurality of attribute-value pairs. Each attribute name identifies a particular attribute of a corresponding object, and the value associated with the key is the value of that attribute for the corresponding object.

As shown, each object is identified by an object identifier (Object ID), which, in embodiments, is a string (or number) that is unique across all cloud storage providers at which an end user maintains data, and that corresponds to a particular file or directory that the end user has stored with one of the cloud storage providers. Alternatively, the Object ID may correspond to a file or directory that an end user stores on a local drive.

The "Kind" attribute is used to specify an object kind for the object identified in the Object ID field. According to embodiments, the value of the Kind attribute may be "File" (which indicates that the object identified by the corresponding Object ID is a file), or the value of the Kind attribute may be "Dir" (indicating that the object identified by the corresponding Object ID is a directory).

The "Type" attribute indicates whether the object identified by the corresponding Object ID is stored at a single cloud storage provider (or on a single local drive) or, alternatively, is divided into chunks and distributed among multiple cloud storage providers. For example, an object (e.g., a file) that is distributed among multiple cloud storage providers has a first subset of data blocks stored at a first cloud storage provider, a second subset of data blocks stored at a second cloud storage provider, and so on. This feature is particularly useful when an end user has multiple cloud storage provider accounts, but where none of the accounts has enough capacity to store a particular file. In such an event, the user may create the file (using client 130 and file system 150), and define the file as type "multiple." In that case, object storage manager 101 communicates with multiple cloud storage providers that the end user has an account with, allocates the file among cloud storage providers that can accommodate storing portions of the file, and updates metadata 105 (i.e., table 207) to indicate that the allocated file is of type "multiple." In addition, object storage manager 101 records (in metadata 105) the various cloud storage providers at which the different portions of the type "multiple" file are stored.

The "location" (or "Loc") attribute indicates where the object identified by the corresponding Object ID is stored. For example, the value of the location attribute may be an identifier for a cloud storage provider (similar to the cloud ID field in table 206). The value of the location attribute may also be a local drive of (or network drive that is locally accessible to) a host computer used by an end user of federated cloud storage system 100. In addition, the value of the location attribute may be set to "object metadata," which means that the object is stored exclusively in metadata 105. Since metadata 105 does not store any file data, only directories are defined as having location "object metadata." It should be noted that a file of type "multiple" (which has portions thereof stored with different cloud providers) would have more than one value for the location attribute, where each value indicates a different cloud storage provider.

The value of the account attribute (depicted as "Acct" in FIG. 2) indicates an account identifier maintained by an end user for a cloud storage provider (i.e., the cloud storage provider identified in the location field), and is similar to the account field stored in table 206. The account attribute enables the storage of file metadata for files that an end user has stored under different accounts with the same cloud storage provider.

The size field of table 207 indicates the amount of storage utilized by the data blocks of the object identified by the corresponding Object ID. It should be noted that this applies only to files because data blocks are not stored for directories.

The next field depicted in FIG. 2 is a parent field. The parent field is a field that indicates a parent directory for the object identified by the corresponding Object ID. The parent field is used by file system 150 to construct a hierarchy of objects to display to an end user.

In the example depicted in FIG. 2, table 207 stores six records for user ID User1. The first record has object ID MyFiles, which is defined as a directory located in the object metadata (i.e., metadata 105). MyFiles indicates a root directory for User1 in file system 150. That is, for User1, all files viewed hierarchically in file system 150 are viewed as located either in MyFiles, or in a subdirectory below MyFiles. This is also indicated by the parent field for MyFiles, which is set to a null value. Further, MyFiles serves as a mount point for files and directories stored with different cloud storage providers. MyFiles may also, itself, be mounted to another file system (such as a Network File System (NFS)). For example, an NFS server may mount (attach) MyFiles at a location/misc/netfiles.

Table 207 also stores a record for object ID File 1a, which is a "single" type file (i.e., a file that is stored at a single cloud storage provider or a single local drive). As shown, File 1a is stored at cloud storage 122₁, under User1's account "Acct a." Thus, the corresponding record for File 1a in table 207 indicates this. Further, File 1a is 500 megabytes (MB) in size and the parent directory for File 1a is MyFiles. This means that, when viewing file system 150 in federated mode (described below), File 1a appears to be located in directory MyFiles.

User1 maintains a second account (Acct b) with cloud storage 122₁. In account b, User1 has stored a directory (depicted as Dir 1b) and, stored in directory Dir 1b, a file (depicted as File 1b). Thus, table 207 stores corresponding records for Dir 1b (where the kind field is Dir) and File 1b (where the kind field is File), both of which have a location field set to cloud storage 122₁. Further, the records for Dir 1b and File 1b have account fields set to "b" (corresponding to account b). Since Dir 1b is a directory, the size field for Dir 1b is null. The size field for File 1b is set to 200 MB. In addition, the parent field for Dir 1b is set to MyFiles, while the parent field for File 1b is set to Dir 1b. Thus, when viewing the file hierarchy for User1 in file system 150 (i.e., in federated mode), Dir 1b appears to be located in directory MyFiles (i.e., as a peer of File 1a), and File 1b appears to be located in directory Dir 1b.

In addition, User1 maintains an account (Acct c) with cloud storage 122₂. User1 has stored at Acct c one file (File 1c). Thus, table 207 stores a record corresponding to File 1c. As shown, File 1c has location field set to cloud storage 122₂ and account field set to c, which corresponds to cloud storage 122₂ depicted in the figure. Further, since File 1c is a file (as opposed to a directory), the size field for File 1c is stores the amount of storage utilized by File 1c in cloud storage 122₂ (i.e., 400 MB). Finally, the parent field for File 1c is set to MyFiles, which means that an end user viewing User1's file hierarchy through file system 150 sees File 1c as located in directory MyFiles, as a peer of File 1a and directory Dir 1b.

User1 also has a file (named "Local File") stored on local drive 160. Thus, table 207 also stores a record corresponding to Local File. As shown, the location of Local File is local drive 160. Since Local File is stored on a local drive, and not with a cloud storage provider, the account field for Local File is null. Local File utilizes 300 MB of storage on local drive 160, which is reflected in the size field of the table record corresponding to Local File. In addition, the parent field for Local File is set to MyFiles. Thus, an end user that views User1's file hierarchy through file system 150 (in federated mode) sees Local File as located in directory MyFiles.

As shown in FIG. 2, client 130 includes federated indicator 208. Federated indicator 208 is a binary indicator that takes on one of two values, such as "Yes" or "No." When federated indicator 208 is set to Yes, file system 150 exposes the file hierarchy of an end user of client 130 (e.g., User1) in "federated" mode. When file system 150 exposes the file hierarchy in federated mode, client 130 displays the file hierarchy without displaying the cloud storage providers and accounts that physically store the individual files and directories. Thus, when viewing the file hierarchy in federated mode, the distributed file hierarchy appears as a unified file hierarchy, where the details pertaining to where those files are stored (e.g., one or more cloud storage providers) is hidden from the viewer.

On the other hand, when federated indicator 208 is set to No, then file system 150 exposes the file hierarchy of an end user in "non-federated" mode. When file system 150 exposes the file hierarchy in non-federated mode, client 130 displays the file hierarchy including the cloud storage providers and accounts that physically store the individual files and directories. Then, when viewing the file hierarchy in non-federated mode, an end user is able to see the various locations in a distributed file hierarchy at which individual files and directories are stored. Further, in either federated or non-federated mode, the end user is able to access file system 150 to perform create, read, update, delete (i.e., "CRUD") operations on the files in federated cloud storage system 100. Further, in either mode, the end user is able to access file system 150 to perform file management operations (e.g., moving and copying files and directories) between cloud storage providers in a seamless fashion.

Figure 3B:
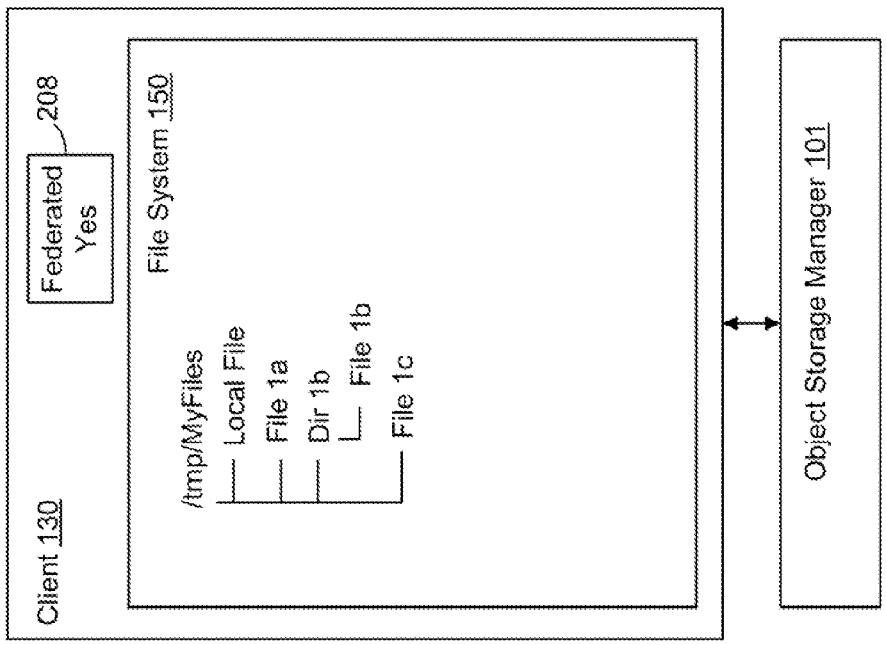
FIGS. 3A and 3B depict a file hierarchy displayed in non-federated mode and in federated mode, respectively, according to embodiments.
Figure 3A:
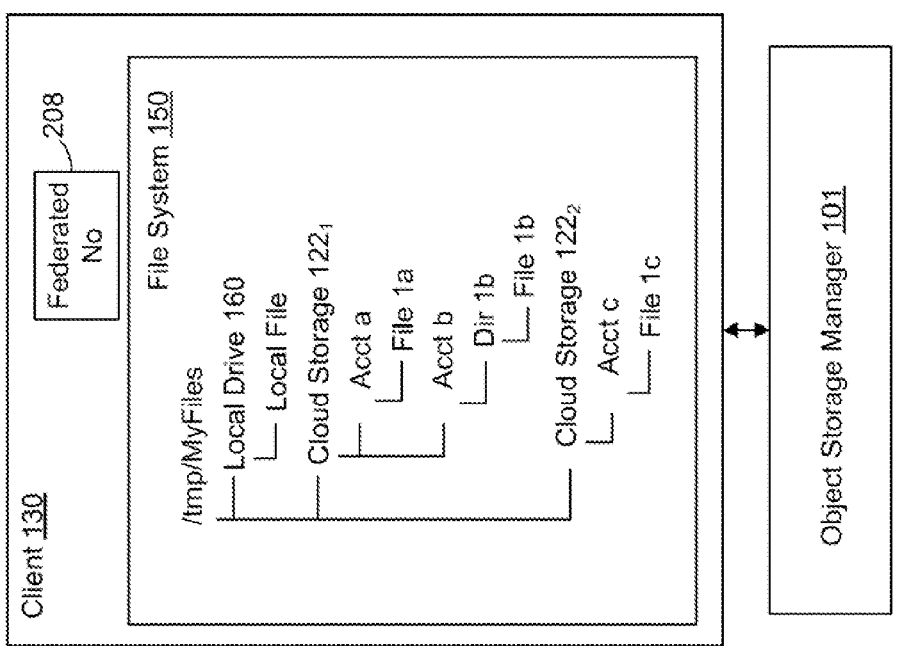

FIGS. 3A and 3B depict, respectively, a file hierarchy displayed in non-federated mode and in federated mode, according to embodiments. The file hierarchies depicted in FIGS. 3A and 3B correspond to the metadata stored for User1 in metadata 105, which is depicted in FIG. 2.

FIG. 3A illustrates the file hierarchy for User1 displayed in non-federated mode. File system 150 exposes the file hierarchy in non-federated mode because federated indicator 208 in client 130 is set to No. As shown, MyFiles (the root directory of federated cloud storage system 100) is mounted at the /tmp directory. The /tmp directory may be either a local or network directory. Located in the MyFiles directory is Local Drive, cloud storage $122_1$, and cloud storage $122_2$, which correspond to the cloud storage providers and local drives that are attached (i.e., mounted) to federated cloud storage system 100. Further, accounts a and b are depicted at the next level below cloud storage system $122_1$, corresponding to the two accounts that User1 maintains with cloud storage $122_1$. In addition, depicted at the next level below cloud storage $122_2$ is account c, corresponding to the account that User1 maintains with cloud storage $122_2$. When viewing file system 150 in non-federated mode, the files are depicted as located at their corresponding cloud storage providers (or local drive, as the case may be). Therefore, Local File is depicted under local drive 160, File 1a is depicted under account a, dir 1b (with file 1b stored therein) is depicted under account b, and File 1c is depicted under account c.

By contrast, when the file hierarchy is viewed in federated mode, the underlying details of which cloud storage providers store the individual directories and files is hidden from view. Thus, in FIG. 3A, Local File, File 1a, Dir 1b, and File 1c are all peers residing at the next level below /tmp/MyFiles. This structure is in accordance with the parent field of each of the records corresponding to these files and directories, as depicted in table 207 of FIG. 2. Indeed, the parent field of Local File, File 1a, Dir 1b, and File 1c are all set to MyFiles. File 1b, though, has parent directory Dir 1b and is, therefore, displayed in the figure as being located within directory Dir 1b.

When viewing a file hierarchy in federated mode, duplicate file names may present a problem. This is due to the fact that an end user may store a first file with a first cloud storage provider and a second file at a second cloud storage provider (or on a local drive), where the first and second files have the same name, but different content. However, when a file hierarchy is viewed in non-federated mode, this problem does not arise because each file is displayed as being stored with a particular cloud storage provider or on a particular local drive.

Figure 4B:
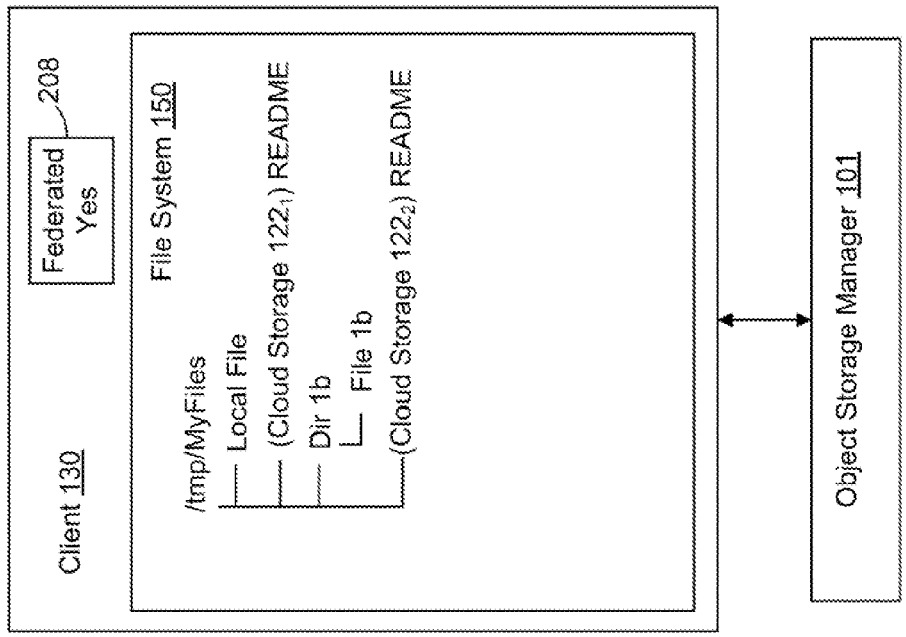
FIGS. 4A and 4B depict a file hierarchy displayed in non-federated mode and in federated mode, respectively, where the file hierarchy includes files with duplicate file names.
Figure 4A:
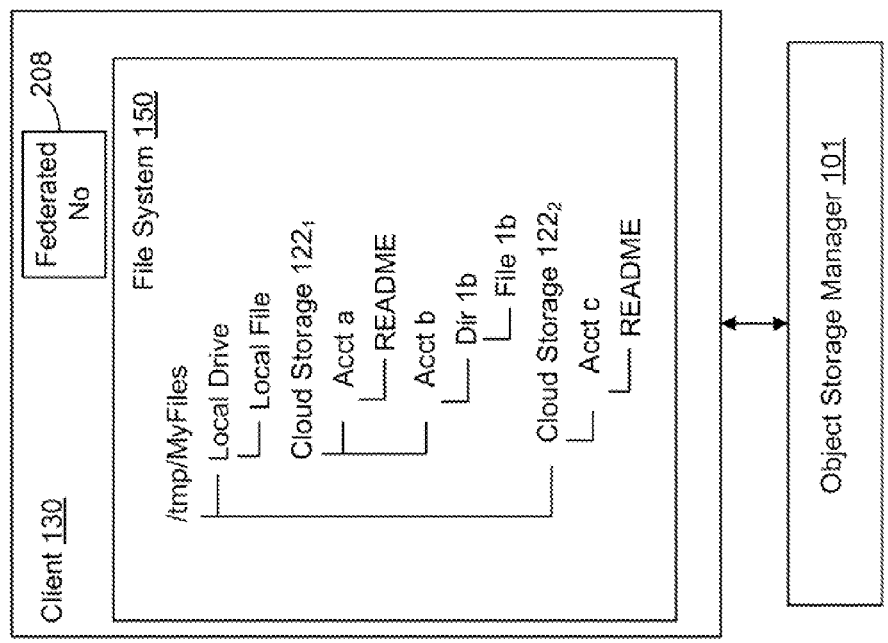

FIG. 4A depicts a file hierarchy displayed in non-federated mode, where the file hierarchy includes files with duplicate file names. FIG. 4A is identical to FIG. 3A except that File 1a and File 1c are both renamed to the file name "README." All other information corresponding to the files (including the parent directory for each file) remains the same. As shown, file system 150 exposes the file hierarchy in a manner such that the two README files are distinguishable (i.e., each README file is shown as being stored under a different account on a different cloud storage provider). However, if file system 150 exposes the file hierarchy in federated mode, then the two README files would be displayed as residing in the same directory (i.e., MyFiles), based on the parent directory specified for each file in table 207. Thus, a way of distinguishing between the two files is advantageous.

FIG. 4B depicts a file hierarchy that is displayed in federated mode, where the hierarchy includes files having duplicate file names. As in FIG. 4A, File 1a (stored in cloud storage $122_1$) and File 1c (stored in cloud storage $1222$) have both been renamed to README. Further, based on the records for each of the files stored in table 207, each file would be displayed in federated mode as being located in the MyFiles directory. In order to allow for displaying the two README files in a manner in which the two files may be distinguished from each other, file system 150 determines (based on the records stored for each file in table 207) that both README files reside in the same parent directory (i.e., MyFiles), and that the files have the same name. Having determined that the file names are in conflict, file system 150 also obtains the cloud storage provider that each of the README files are stored in and associates (in the file system) the respective cloud storage provider with the corresponding file name. In one or more embodiments, file system 150 performs this association by updating inodes in file system 150 which correspond to the two files. For example, file system 150 updates the inode for the README file stored in cloud storage $122_1$ by storing therein an attribute that identifies cloud storage $122_1$. Similarly, file system 150 updates the inode for the README file stored in cloud storage $122_2$ by storing therein an attribute that identifies cloud storage $122_2$. Thus, when client 130 obtains the file hierarchy for User1 from file system 150, client 130 reads (or is provided with) the aforementioned attributes associated with each of the files. After obtaining these attributes, client 130 displays, for each of the files having duplicate file names, the particular cloud storage provider at which the file is stored. This is depicted in FIG. 4A, where cloud storage $122_1$ is displayed alongside the README file that is stored in cloud storage $122_1$, and cloud storage $122_2$ is displayed alongside the README file that is stored in cloud storage $122_2$. In this way, the file hierarchy for User1 may be displayed in federated mode while files with duplicate names that appear in the same directory are distinguishable from each other.

Figure 5:
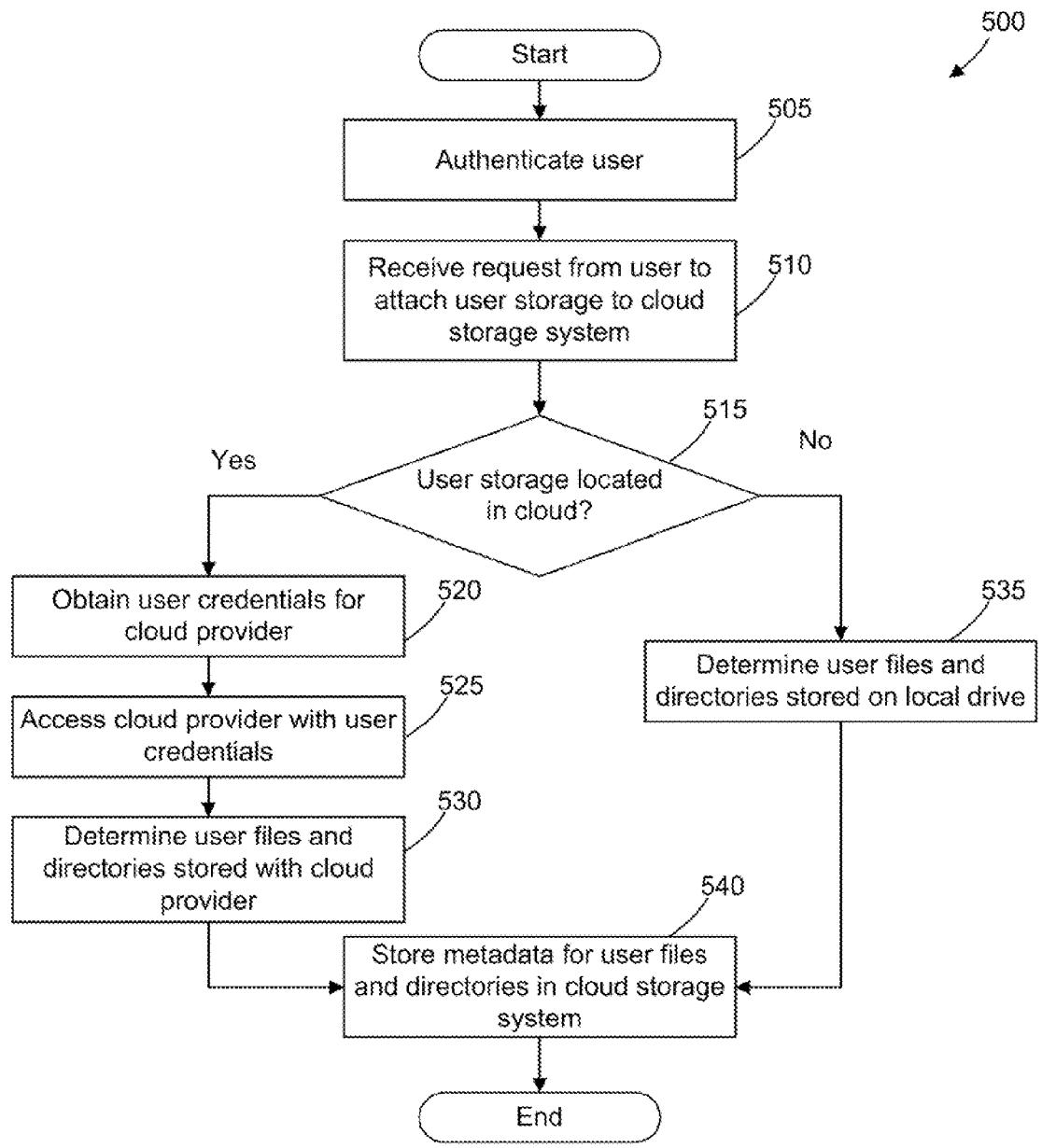
FIG. 5 is a flow diagram that illustrates a method for attaching user storage to a federated cloud storage system, according to one or more embodiments.

FIG. 5 is a flow diagram that illustrates a method 500 for attaching a user storage to a federated cloud storage system, according to one or more embodiments. One embodiment of a federated cloud storage system is federated cloud storage system 100, depicted in FIG. 1. Further, in accordance with embodiments, method 500 is performed by the various components of federated cloud storage system 100, such as authenticator 140, object storage manager 101, and cloud storage interface manager 110, all of which are illustrated in FIG. 1.

Method 500 begins at step 505, where an end user is authenticated to use federated cloud storage system 100. In one embodiment, an end user accesses client 130 to provide credentials (such as a user ID and password) to authenticator 140. Authenticator 140 then authenticates the end user based on the provided credentials, and returns an indication to object storage manager 101 that the end user has been successfully authenticated.

Once the end user is authenticated, method 500 proceeds to step 510. At step 510, object storage manager 101 receives a request from the end user to attach a "user storage" (i.e., a cloud-based or local storage that the end user has access to) to federated cloud storage system 100. According to one or more embodiments, the request from the end user includes information that indicates whether the storage that the end user has requested to be attached is located in the cloud or, alternatively, is stored on a local drive that is accessible to the end user. The request also includes an identifier for the user storage. For example, if the user storage is associated with a local drive of the host computer that the request is received from, then the request includes an identifier for the host computer, the particular local drive of the host computer, and one or more subdirectories of the file system stored on that local drive. As an example, if an end user wishes to attach a local subdirectory named C:\User\Data to federated cloud storage system 100, then the request received at step 510 would include an identifier for the host computer (such as a network address or host name), an identifier for the local drive (i.e., C:), and an identifier for the subdirectory (i.e., \User\Data).

On the other hand, if the user storage that is to be attached to federated cloud storage system 100 is located in the cloud (i.e., is stored at a cloud storage provider), then the request would include an identifier for the cloud storage provider (e.g., a Cloud ID, as depicted in table 206 in FIG. 2) and one or more files or subdirectories that the end user has stored with the identified cloud storage provider. For example, if the end user wishes to attach a subdirectory named /bin/apps/ that is stored on a Google Drive™, then the request includes an identifier for the particular Google Drive™ that the user wishes to attach to federated cloud storage system 100 (such as a particular network address and port), as well as the subdirectory /bin/apps. In addition, in some embodiments, the request may also include end user credentials to be provided to the cloud storage provider identified in the request.

At step 515, object storage manager 101 determines, based on information in the received request, whether the user storage that the end user has requested to be attached to federated cloud storage system 100 is located in the cloud (i.e., whether the storage is associated with a cloud storage provider). If object storage manager 101 determines that the user storage identified in the request is located with a cloud storage provider, then method 500 proceeds to step 520.

At step 520, object storage manager 101 obtains end user credentials for the cloud storage provider identified in the request. As mentioned above, in some embodiments, end user credentials for the cloud storage provider are transmitted with the request. However, in other embodiments, object storage manager 101 obtains the end user credentials from metadata 105. For example, in one embodiment, object storage manager 101 performs a lookup in table 206, based on user ID and cloud ID. Using this information, object storage manager 101 is able to obtain one or more accounts and corresponding passwords for the particular cloud storage provider.

Once object storage manager 101 obtains user credentials for a cloud storage provider, then, at step 525, object storage manager 101 accesses the cloud storage provider using the obtained user credentials. According to one or more embodiments, object storage manager 101 transmits an access request to the particular cloud storage provider via cloud storage interface manager 110, as shown in FIG. 1. Cloud storage interface manager 110 then determines, based on the access request, the target cloud storage provider and invokes an appropriate cloud provider interface 115. The invoked cloud provider interface 115 then communicates with the target cloud storage provider using a corresponding cloud API 121. The target cloud storage provider (such as, for example, Google Drive™, Dropbox®, or OneDrive® from Microsoft, Inc.) then examines and verifies the user credentials. If the target cloud storage provider verifies the user credentials, then a session is established between object storage manager 101 and the target cloud storage provider, whereby data may be subsequently transmitted between these entities.

Assuming that the target cloud storage provider verifies the user credentials provided at step 525, method 500 then proceeds to step 530. At step 530, object storage manager 101 determines the files and directories that the end user has stored with the cloud storage provider. Object storage manager 101 performs this step in order to determine the directory structure of the data that the user has stored at the cloud storage provider, which is used to create the metadata that is stored in table 207 of metadata 105. If the request received from the end user at step 505 specifies a particular directory within the target cloud storage provider, then object storage manager 101 determines the files and subdirectories that exist below the directory specified in the request. On the other hand, if the request received at step 505 does not specify a particular directory, then object storage manager determines all directories and files that the end user has stored with the target cloud storage provider.

It should be noted that the determination at step 530 may be performed by object storage manager 101 transmitting a command (such as the "list" method call that may be invoked for Google Drive™). In response, the target cloud storage provider returns one or more data structures in response, which indicates which files and directories the end user has stored at the target cloud storage provider. In some embodiments, in order to determine the full set of files and directories (as well as the directory structure) storage at the target cloud storage provider, several commands (and corresponding responses) may be required. It should also be noted that steps 525 and 530 may be combined, according to some embodiments. That is, object storage manager 101 may transmit both user credentials and a command to obtain the directory structure stored for the end user at the target cloud storage provider. In such a case, a persistent session is not established between object storage manager 101 and the target cloud storage provider. Rather, the target cloud storage provider verifies user credentials that object storage manager 101 provides with each command.

Once object storage manager 101 obtains the directory structure stored for the end user at the target cloud storage provider, object storage manager 101, at step 540, stores metadata for the end user directories and files in metadata 105. For example, assume that the requesting end user wishes to attach to federated cloud storage system 100 the bin/apps/ subdirectory stored for the end user account at the cloud storage provider. Further, assume that /bin/apps contains two files, x.txt and y.txt. In this case, according to one or more embodiments, object storage manager 101 stores two records in table 207 of metadata 105. The first record corresponds to x.txt, and would contain an object identifier for x.txt (which may be a text string or inode number), a kind field set to "file," and a type field set to "single." Further, object storage manager 101 would set the location field of the record to the network address (or other identifier) for the target cloud storage provider. Object storage manager 101 sets the account field to identify the account the end user maintains with the target cloud storage provider, and the size field to the amount of storage that x.txt utilizes at the target cloud storage provider. The parent field is set to be the "root" directory (or mount point) maintained for the end user in federated cloud storage system 100. For example, if the root directory is "MyFiles" (as depicted in FIG. 1), then the parent field of the record for x.txt is set to MyFiles.

Similarly, the second record that object storage manager 101 stores in table 207 corresponds to the file y.txt. Each field in the record for y.txt is identical to that stored for the file x.txt, with the exception of the object identifier. Thus, after storing the metadata for each file, an end user that views file system 150 (which is constructed based on the metadata stored in metadata 105) sees x.txt and y.txt as peer files that are located in directory MyFiles.

Referring back to step 515, if object storage manager 101 determines that the user storage the end user requested to be attached to federated cloud storage system 100 is not located in the cloud, then method 500 proceeds to step 535. It should be noted that object storage manager 101 makes this determination based on the request received from the end user. As mentioned above, the request received at step 505 may include an indicator as to whether the storage to be attached to federated cloud storage system 100 is located in the cloud. In addition, if the storage is located on a local drive of the end user's host computer, then the request includes an identifier for the host computer (such as a network address or host name) and a drive letter (or drive letter and corresponding subdirectory) that corresponds to a disk attached to the host computer. It should be noted that, when object storage manager 101 executes on the end user's host computer, then an identifier for the host computer is not required.

At step 535, object storage manager 101 determines the directories and files stored on the local drive (or in the local subdirectory) that is to be attached to federated cloud storage system 100. Because the request corresponds to a local drive, object storage manager 101 does not issue commands through cloud storage interface manager 110. Rather, object storage manager 101 issues commands directly to the local drive in order to determine the set of files and directories that are stored on the local drive to be attached. For example, if the local drive is located on a host computer executing a version of the Linux® operating system, then object storage manager 101 issues the Unix "ls" command in order to determine the set of directories and files that are stored on the local drive. On the other hand, if the local drive is located on a host computer that executes a version of the Windows® operating system, then object storage manager 101 issues the "DIR" command to determine the set of files and directories that are stored on the local drive.

After object storage manager 101 determines the files and directories that are stored on the local drive that is to be attached to federated cloud storage system 100, method 500 proceeds to step 540. As previously described with respect to the attachment of cloud-based user storage, object storage manager 101 stores (in similar fashion) metadata corresponding to the files and directories stored on the local drive in metadata 105.

Figure 6:
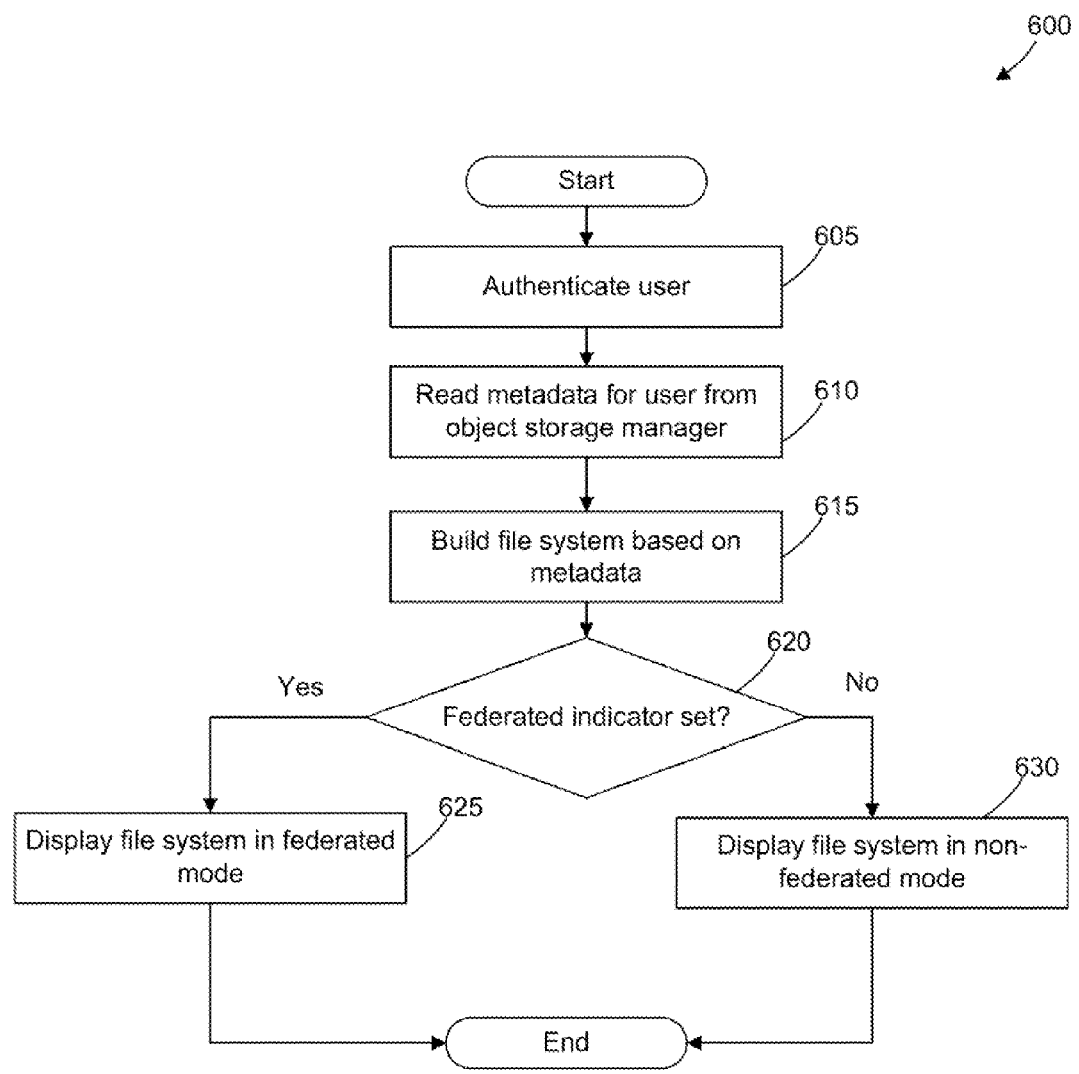
FIG. 6 is a flow diagram that depicts a method for displaying a file system corresponding to a federated cloud storage system, according to one or more embodiments.

FIG. 6 is a flow diagram that depicts a method 600 for displaying a file system for a federated cloud storage system, according to one or more embodiments. Method 600 is performed by a federated cloud storage client (such as client 130, depicted in FIG. 1) that includes a file system for a federated cloud storage system (such as file system 150, also depicted in FIG. 1). Further, method 600 is typically performed in response to a request from an end user to view the file system. An end user generates such a request, for example, by issuing a request to view the file system using client 130. In other embodiments, an end user generates the request by starting client 130.

Method 600 begins at step 605, where an end user is authenticated to use federated cloud storage system 100. The steps to authenticate the end user that are performed at step 605 are identical to the steps performed at step 505 of method 500, depicted in FIG. 5.

Once the end user is authenticated, method 600 proceeds to step 610. At step 610, file system 150 reads metadata for the user that is stored with object storage manager 101. Specifically, the metadata for the end user is stored in table 207 in metadata 105, which is shown in FIG. 1. As previously described, each record stored in table 207 corresponds to an object (either a directory or a file) that the end user has associated (i.e., "attached") to federated cloud storage system 100.

After reading the metadata at step 610, file system 150 then constructs a file system therein based on the metadata. According to one or more embodiments, file system 150 is structured as a hierarchical file system (similar to the Unix file system), which is comprises of files and directories. File system 150 itself may be attached (or mounted) to an already-existing file system that the end user accesses on a host system. In such a case, the root directory of file system 150 appears as a subdirectory of the directory at which file system 150 is mounted. Alternatively, file system 150 may be a standalone file system, in which case the root directory of file system 150 is not a subdirectory. For example, the embodiments depicted in FIGS. 3A, 3B, 4A, and 4B depict the root directory of file system 150 (i.e., MyFiles) as a subdirectory of /tmp, which is a directory of the end user's host file system. That is, /tmp is the mount point for file system 150, where MyFiles is the root directory of file system 150.

At step 620, file system 150 determines whether a federated indicator is set. An example of such a federated indicator is depicted in FIG. 2 as federated indicator 208. As previously mentioned, if federated indicator 208 is set to Yes, then file system 150 is exposed (or is displayed) in "federated" mode. When file system 150 is displayed in federated mode, information pertaining to the physical location at which a particular file or directory in file system 150 is stored (e.g., the cloud storage provider at which the file or directory is stored) are hidden from the viewer when the file system is displayed in a user interface. On the other hand, if federated indicator 208 is set to No, then details pertaining to the physical location at which the file or directory is stored is made visible to the user when the file system is displayed.

If file system 150 determines that federated indicator 208 is set to Yes, then method 600 proceeds to step 625. At step 625, client 130 displays file system 150 to the end user in federated mode (i.e., without displaying the different cloud storage providers or local drives at which the files and directories are stored). Thus, when viewed in federated mode, the objects arranged in file system 150 appear as though they are stored in a local, integrated file system. Examples of the displaying of file system 150 in federated mode appear in FIGS. 3B and 4B. Further, according to some embodiments, when federated indicator 208 is set to Yes, file system 150 exposes to client 130 only the inodes and directories corresponding to the objects for which metadata is stored in table 207. Thus, as shown in FIG. 3B, there are six objects displayed hierarchically in file system 150, each of which corresponds to one of the six records stored in table 207. Thus, when client 130 renders the view of file system 150, client 130 only renders the objects exposed by file system 150.

On the other hand, if file system 150 determines that federated indicator 208 is set to NO, then method 600 proceeds to step 625, where client 130 displays file system 150 in non-federated mode (i.e., displaying the files and directories of the end user as located at corresponding cloud storage providers or local drives). When viewed in non-federated mode, objects arranged in file system 150 appear as though they are stored at a cloud storage provider or on a local drive, as the case may be. Examples of the displaying of file system 150 in non-federated mode appear in FIGS. 3A and 4A. In some embodiments, when federated indicator 208 is set to No, file system 150 dynamically "inserts" inodes at appropriate places in the file hierarchy in order to reflect the cloud storage providers and local drives at which the files and directories are stored. For instance, referring to FIG. 3A, file system 150 inserts an inode corresponding to Local Drive 160 in the file hierarchy below the inode corresponding to MyFiles and the inode corresponding to Local File. Similarly, file system 150 dynamically inserts inodes for cloud storages 122$_1$ and 122$_2$, as well as accounts a, b, and c.

It should be noted that, in some embodiments, file system 150 automatically detects changes to federated indicator 208 and, after detecting a change, reconstructs the file hierarchy therein. Thus, when an end user requests to view file system 150, the file hierarchy is already properly constructed (i.e., in federated or non-federated mode).

Further, an end user viewing file system 150 in non-federated mode may perform data management tasks related to the cloud storages included therein. For example, in FIG. 3A, file system 150 is displayed (by client 130) in non-federated mode. According to one or more embodiments, an end user may, using client 130, migrate files between cloud storage providers. For instance, assuming that client 130 displays a GUI to an end user, the end user may select Local File using a mouse-click, and, using a "drag-and-drop" action, drag Local File to "subdirectory" account a, located on cloud storage 122$_1$. Performing this step results in Local File being migrated from local drive 160 to account a of cloud storage 122$_1$. Similarly, and end user may, using client 130, migrate files from a cloud storage provider to local drive 160, or, alternatively, migrate files between cloud storage providers.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) -CD-ROM, or a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of attaching user storage to a central storage management system, the method comprising:
   receiving a first request to attach a first cloud-based user storage to the central storage management system;
   receiving a second request to attach a second cloud-based user storage to the central storage management system;
   accessing the first and second cloud-based user storages and determining, respectively, first and second sets of objects stored therein;
   for each object in the first and second sets of objects, storing corresponding metadata in the central storage management system, wherein the metadata indicates the cloud-based user storage at which the corresponding object is stored, and wherein the metadata for each object stores relationship information, the relationship information indicating an immediate parent object corresponding to the object; and
   updating a file system corresponding to the central storage management system, the file system implementing an object hierarchy based on the relationship information stored in the metadata for each object, wherein the updating of the file system comprises creating, in the file system, a plurality of attributes, each attribute corresponding to an object in the first set of objects.

2. The method of claim 1, further comprising:
   receiving a third request to attach a local user storage to the central storage management system, wherein the local user storage is a storage device that is coupled to a host computer from which the third request is transmitted;
   accessing the local user storage and determining a third set of objects stored therein; and
   for each object in the third set of objects, storing corresponding metadata in the central storage management system.

3. The method of claim 2, wherein the objects in the first, second and third sets of objects comprise files and directories.

4. The method of claim 1, further comprising:
   responsive to receiving the first and second requests, obtaining a first set of user credentials transmitted with the first and second requests; and
   authenticating the first set of user credentials.

5. The method of claim 4, wherein accessing the first and second cloud-based user storages comprises:
   obtaining second and third sets of user credentials, the second set of user credentials corresponding to a first cloud storage provider that stores the first cloud-based user storage and the third set of user credentials corresponding to a second cloud storage provider that stores the second cloud-based user storage;
   transmitting, to the first cloud storage provider, the second set of user credentials;
   transmitting, to the second cloud storage provider, the third set of user credentials; and
   receiving, from the first and second cloud storage providers, responses indicating whether access to the respective cloud-based user storage is permitted.

6. The method of claim 5, wherein the transmitting of the second and third sets of user credentials comprises:
   transmitting the second and third sets of user credentials to a communication layer, the communication layer including a plurality of communication modules, each communication module corresponding to a cloud storage provider;
   determining, by the communication layer, that the second set of user credentials are to be transmitted to the first cloud storage provider and that the third set of user credentials are to be transmitted to the second cloud storage provider; and
   responsive to the determining, selecting, by the communication layer, a first communication module corresponding to the first cloud storage provider and a second communication module corresponding to the second cloud storage provider and transmitting, by the communication layer, the second and third sets of user credentials using the corresponding selected communication module.

7. The method of claim 1 wherein, if a mode indicator corresponding to a user indicates that the central storage system is in a federated mode, the updating further comprises creating in the file system a descriptor corresponding to a cloud storage provider that stores the cloud-based user storage.

8. A non-transitory computer-readable medium that stores instructions, where the instructions, when executed, cause a computer to perform a method of attaching user storage to a central storage management system, the method comprising:
   receiving a first request to attach a first cloud-based user storage to the central storage management system;
   receiving a second request to attach a second cloud-based user storage to the central storage management system;
   accessing the first and second cloud-based user storages and determining, respectively, first and second sets of objects stored therein;
   for each object in the first and second sets of objects, storing corresponding metadata in the central storage management system, wherein the metadata indicates the cloud-based user storage at which the corresponding object is stored, and wherein the metadata for each object stores relationship information, the relationship information indicating an immediate parent object corresponding to the object; and
   updating a file system corresponding to the central storage management system, the file system implementing an object hierarchy based on the relationship information stored in the metadata for each object, wherein the updating of the file system comprises creating, in the file system, a plurality of attributes, each attribute corresponding to an object in the first set of objects.

9. The computer-readable medium of claim 8, wherein the method further comprises:
   receiving a third request to attach a local user storage to the central storage management system, wherein the local user storage is a storage device that is coupled to a host computer from which the third request is transmitted;
   accessing the local user storage and determining a third set of objects stored therein; and
   for each object in the third set of objects, storing corresponding metadata in the central storage management system.

10. The computer-readable medium of claim 9, wherein the objects in the first, second, and third sets of objects comprise files and directories.

11. The computer-readable medium of claim 8, wherein the method further comprises:
    responsive to receiving the first and second requests, obtaining a first set of user credentials transmitted with the first and second requests; and
    authenticating the first set of user credentials.

12. The computer-readable medium of claim 11, wherein accessing the first and second cloud-based user storages comprises:
  obtaining second and third sets of user credentials, the second set of user credentials corresponding to a first cloud storage provider that stores the first cloud-based user storage and the third set of user credentials corresponding to a second cloud storage provider that stores the second cloud-based user storage;
  transmitting, to the first cloud storage provider, the second set of user credentials;
  transmitting, to the second cloud storage provider, the third set of user credentials; and
  receiving, from the first and second cloud storage providers, responses indicating whether access to the respective cloud-based user storage is permitted.

13. The computer-readable medium of claim 12, wherein the transmitting of the second and third sets of user credentials comprises:
  transmitting the second and third sets of user credentials to a communication layer, the communication layer including a plurality of communication modules, each communication module corresponding to a cloud storage provider;
  determining, by the communication layer, that the second set of user credentials are to be transmitted to the first cloud storage provider and that the third set of user credentials are to be transmitted to the second cloud storage provider; and
  responsive to the determining, selecting, by the communication layer, a first communication module corresponding to the first cloud storage provider and a second communication module corresponding to the second cloud storage provider and transmitting, by the communication layer, the second and third sets of user credentials using the corresponding selected communication module.

14. The computer-readable medium of claim 8 wherein, if a mode indicator corresponding to a user indicates that the central storage system is not in a federated mode, the updating of the file system further comprises creating, in the file system, a descriptor corresponding to a cloud storage provider that stores the cloud-based user storage.

15. A system, comprising:
  a computer processor;
  memory; and
  a central storage management computer system configured to:
  receive a first request to attach a first cloud-based user storage to the central storage management computer system;
  receive a second request to attach a second cloud-based user storage to the central storage management computer system;
  access the first and second cloud-based user storages and determine, respectively, first and second sets of objects stored therein;
  for each object in the first and second sets of objects, store corresponding metadata in the central storage management computer system, wherein the metadata indicates the cloud-based user storage at which the corresponding object is stored, and wherein the metadata for each object stores relationship information, the relationship information indicating an immediate parent object corresponding to the object; and
  update a file system corresponding to the central storage management computer system, the file system implementing an object hierarchy based on the relationship information stored in the metadata for each object, wherein a process of updating the file system comprises creating, in the file system, a plurality of attributes, each attribute corresponding to an object in the first set of objects.

16. The system of claim 15, wherein the central storage management computer system is further configured to:
  receive a third request to attach a local user storage to the central storage management computer system, wherein the local user storage is a storage device that is coupled to a host computer from which the second request is transmitted;
  access the local user storage and determining a third set of objects stored therein; and
  for each object in the third set of objects, store corresponding metadata in the central storage management computer system.

17. A method of attaching user storage to a central storage management system, the method comprising:
  receiving a first request to attach a first cloud-based user storage to the central storage management system;
  receiving a second request to attach a second cloud-based user storage to the central storage management system;
  responsive to receiving the first and second requests, obtaining a first set of user credentials transmitted with the first and second requests;
  authenticating the first set of user credentials;
  accessing the first and second cloud-based user storages and determining, respectively, first and second sets of objects stored therein, wherein accessing the first and second cloud-based user storages comprises:
    obtaining second and third sets of user credentials, the second set of user credentials corresponding to a first cloud storage provider that stores the first cloud-based user storage and the third set of user credentials corresponding to a second cloud storage provider that stores the second cloud-based user storage;
    transmitting, to the first cloud storage provider, the second set of user credentials;
    transmitting, to the second cloud storage provider, the third set of user credentials; and
    receiving, from the first and second cloud storage providers, responses indicating whether access to the respective cloud-based user storage is permitted; and
  for each object in the first and second sets of objects, storing corresponding metadata in the central storage management system, wherein the metadata indicates the cloud-based user storage at which the corresponding object is stored.

18. A non-transitory computer-readable medium that stores instructions, where the instructions, when executed, cause a computer to perform a method of attaching user storage to a central storage management system, the method comprising:
  receiving a first request to attach a first cloud-based user storage to the central storage management system;
  receiving a second request to attach a second cloud-based user storage to the central storage management system;
  responsive to receiving the first and second requests, obtaining a first set of user credentials transmitted with the first and second requests;
  authenticating the first set of user credentials;
  accessing the first and second cloud-based user storages and determining, respectively, first and second sets of objects stored therein, wherein accessing the first and second cloud-based user storages comprises:

obtaining second and third sets of user credentials, the second set of user credentials corresponding to a first cloud storage provider that stores the first cloud-based user storage and the third set of user credentials corresponding to a second cloud storage provider that stores the second cloud-based user storage;

transmitting, to the first cloud storage provider, the second set of user credentials;

transmitting, to the second cloud storage provider, the third set of user credentials; and receiving, from the first and second cloud storage providers, responses indicating whether access to the respective cloud-based user storage is permitted; and for each object in the first and second sets of objects, storing corresponding metadata in the central storage management system, wherein the metadata indicates the cloud-based user storage at which the corresponding object is stored.

19. A system, comprising:

a computer processor;

memory; and a central storage management computer system configured to:

receive a first request to attach a first cloud-based user storage to the central storage management computer system;

receive a second request to attach a second cloud-based user storage to the central storage management computer system;

responsive to receiving the first and second requests, obtain a first set of user credentials transmitted with the first and second requests;

authenticate the first set of user credentials;

access the first and second cloud-based user storages and determining, respectively, first and second sets of objects stored therein; and for each object in the first and second sets of objects, store corresponding metadata in the central storage management computer system, wherein the metadata indicates the cloud-based user storage at which the corresponding object is stored, wherein the central storage management computer system is further configured to:

obtain second and third sets of user credentials, the second set of user credentials corresponding to a first cloud storage provider that stores the first cloud-based user storage and the third set of user credentials corresponding to a second cloud storage provider that stores the second cloud-based user storage;

transmit, to the first cloud storage provider, the second set of user credentials;

transmit, to the second cloud storage provider, the third set of user credentials; and receive, from the first and second cloud storage providers, responses indicating whether access to the respective cloud-based user storage is permitted.

20. A method of attaching user storage to a central storage management system, the method comprising:

receiving a first request to attach a first cloud-based user storage to the central storage management system;

receiving a second request to attach a second cloud-based user storage to the central storage management system;

accessing the first and second cloud-based user storages and determining, respectively, first and second sets of objects stored therein, wherein accessing the first and second cloud-based user storages comprises:

obtaining first and second sets of user credentials, the first set of user credentials corresponding to a first cloud storage provider that stores the first cloud-based user storage and the second set of user credentials corresponding to a second cloud storage provider that stores the second cloud-based user storage;

transmitting, to the first cloud storage provider, the first set of user credentials;

transmitting, to the second cloud storage provider, the second set of user credentials; and receiving, from the first and second cloud storage providers, responses indicating whether access to the respective cloud-based user storage is permitted;

for each object in the first and second sets of objects, storing corresponding metadata in the central storage management system, wherein the metadata indicates the cloud-based user storage at which the corresponding object is stored;

receiving a third request to attach a local user storage to the central storage management system, wherein the local user storage is a storage device that is coupled to a host computer from which the third request is transmitted;

accessing the local user storage and determining a third set of objects stored therein; and for each object in the third set of objects, storing corresponding metadata in the central storage management system.

* * * * *